United States Patent [19]

Silverman

[11] Patent Number: 4,904,422

[45] Date of Patent: Feb. 27, 1990

[54] OZONE AND WEAR RESISTANCE IN STYRENE-BUTADIENE RUBBER

[75] Inventor: Joseph Silverman, Silver Spring, Md.

[73] Assignee: University of Maryland, College Park, College Park, Md.

[21] Appl. No.: 152,291

[22] Filed: Feb. 4, 1988

[51] Int. Cl.$^4$ .................. C08F 279/02; C08J 3/28; C08K 3/30

[52] U.S. Cl. .................. 264/22; 522/3; 522/71; 522/79; 522/81; 522/121; 522/128; 525/284

[58] Field of Search ............ 522/3, 121, 128, 71, 522/79, 81; 264/22; 525/284

[56] References Cited

U.S. PATENT DOCUMENTS 4,122,137 10/1978 Bohm .................. 522/128
4,569,382 2/1988 Maxey .................. 524/535
4,725,646 2/1988 Kobashi .................. 525/61

FOREIGN PATENT DOCUMENTS 881281 11/1961 United Kingdom ............ 522/121

Primary Examiner—John C. Bleutge
Assistant Examiner—David Buttner
Attorney, Agent, or Firm—Oblon, Spivak, McClelland, Maier & Neustadt

[57] ABSTRACT

SBR is treated with sulfur, an optional chemical accelerator and a crosslinking agent, under mild heat, to form a preform having sufficient strength to resist handling. The preform is exposed to substantial irradiation on the order of 5-25 Mrad dose of 10 MeV electrons equivalent, which significantly improves wear resistance, tear strength, crack initiation and growth resistance and ozone resistance.

5 Claims, No Drawings

OZONE AND WEAR RESISTANCE IN STYRENE-BUTADIENE RUBBER

The United States Government may enjoy rights in this invention under U.S. Army Contract DAA-E0784CR086.P4.

BACKGROUND OF THE INVENTION

1. Field of the Invention:

This invention relates to a method for improving mechanical and chemical properties of styrene-butadiene rubber (SBR) and the improved rubber produced thereby.

2. Background of the Prior Art:

SBR is well known as a synthetic alternative to natural rubber (cispolyisoprene) developed in response to rubber shortages encountered during World War II. To improve physical characteristics for many applications, such as tires and the like, specific and selective curing processes have been employed with SBR. Two processes currently tend to dominate the market place.

In a first process, the SBR is modified by the addition of a chemical improver, generally sulfur, and the rubber is cured in the presence of the improver and moderate heat. This is the traditional method of curing SBR for industrial applications such as tires, hoses and the like.

An alternative method begins with limited or "light" irradiation of the polymer, followed by the chemical/thermal curing described above. This process is generally used in the production of components of tires for automobiles, etc. In this process, the initial light irradiation is used to produce a limited crosslink density, which increases "green strength" sufficiently, such that the irradiated preform can withstand the handling in the subsequent tire fabrication process. The major amount of crosslinking, and therefore, curing of the SBR is achieved through the second, heat/sulfur cure stage.

A third class of alternatives includes some variations, either in chemical additives, heating, or irradiation. These combinations and permutations are generally selected with regard to the ultimate end-use of the elastomer, and the particular nature of the elastomer (i.e., styrene content, etc.)

Neither of the dominant methods, nor any known combinations, have been employed in the modification of SBR for the purpose of improving tear strength or ozone resistance.

NR is the focus of U.S. Pat. No. 2,933,441. Therein, a combination of processes, beginning with an accelerated heat cure, using sulfur and a small amount of accelerator, is the first step in the production of a tire. The partially cured preform is treated so as to retain its shape under subsequent irradiation and handling treatments. Thereafter, it is irradiated under an intense, localized beam. The reference discloses such a treatment improves abrasion resistance. It does not discuss ozone resistance or tear strength.

Other references specifically directed to SBR, as opposed to the NR of the reference discussed above, include U.S. Pat. Nos. 4,122,137; 4,230,649 and 4,233,013 all to Bohm et al. These references are directed to the curing of SBR, through a sulfur/heat treatment, followed by irradiation. As suggested in Example 3 of U.S. Pat. No. 4,122,137, the process calls for a relatively large amount of accelerator (1.8 phr) and a reduced irradiation dosage. U.S. Pat. No. 4,230,649 differs from that disclosure principally in using a microwave irradiation step subsequent to the sulfur cure. These patents are all directed to improving the processing efficiency, i.e., reducing in-mold time, and do not focus on the improvement of specific characteristics, such as ozone resistance and hot tear strength. SBR is frequently employed in situations where improved overall wear resistance, tear strength, crack initiation and growth resistance and, in particular, ozone resistance, are of importance, such as in pads for military track vehicles, and the like. In the particular situation of pads for track vehicles, the pads must be of a compound resistant to constant wear over asphalt/concrete surfaces, and cracking and pitting over hilly or cross-country terrain. Suitable materials are routinely evaluated by the military in field tests. Thus, a need continues to exist for a method for improving the mechanical strengths and ozone resistance of SBR for such applications.

SUMMARY OF THE INVENTION

It has now been discovered that exposing SBR, particularly a 1500 type SBR, to a two-step process, first introducing to the polymer a small amount of sulfur and a small amount of multifunctional crosslinking agent and exposing the material, in an appropriate mold, to a moderate heat treatment, followed by relatively significant irradiation of 5-25 Mrad with either 10 MeV electrons or cobalt 60 gamma rays, any other radiation means with similar linear energy transfer properties, results in a substantial increase in hot tear strength, and extraordinary improvements in ozone resistance. This is particularly surprising in view of the fact that it is the general standard of the art that radiation crosslinking does not give the same degree of improvement relative to sulfur-cured SBR.

DETAILED DESCRIPTION OF THE INVENTION

SBR is well known, and generally available from a variety of sources. Most SBR contains about 23% styrene, although alternative formulations contain differing amounts, including, significantly less styrene, down to about 15%. These variations are embraced within the invention set forth herein.

To process the SBR according to the claimed invention, the polymer is first heat treated with sulfur and a sulfur cure accelerator together with an appropriate multifunctional crosslinking agent. The used additives such as carbon black, zinc oxide, stearic acid, an antiozidant (antiozite 2) and antioxidants ordinarily used in rubber formulation with sulfurs are of course included in the butadiene-styrene copolymer composition. These additives do not constitute a novel aspect of the invention. To obtain the results desired, the amount of sulfur and chemical accelerator, as well as multifunctional cross-linking agents, must be carefully controlled. A typical sulfur addition is 0.5 phr, and the accelerator may be present in amounts of about 0.1 phr. These values may range from 0.1 to 0.8 phr for sulfur, and 0 to 0.5 phr for the chemical accelerator. A preferred chemical accelerator is Santocure TM, although alternative, commercially available accelerators may be used. A multifunctional crosslinking agent must be selected to impact a moderate degree of crosslinking, without interfering with the radiation curing, and will therefore be selected on the basis of polymer miscibility, cost and reactivity relative to sulfur and the reaction conditions. A preferred agent is 3,9-divinyl-2,4,8,10 tetraoxyspiro-

[5,5]undecane, (DTUD), available from SIGMA chemical. It may be used from 0.05 phr up to about 2 phr. An exemplary value is about 0.1 phr. Those of ordinary skill in the art will select particular accelerators and crosslinking agents based on specific formulations, and properties other than wear resistance, crack initiation and growth resistance, tear strength and ozone resistance, as desired. This combination is then placed in the desired mold, and heated, to preliminarily cure the SBR formulation, under the applications of moderate heat, e.g., about 300° F. The exposure time is about 70 minutes, but may range from 35-120 minutes. The temperature may similarly range from 280° to 320° F.

The preformed material has sufficient "strength" to resist deformation upon handling, etc. To bring the modified SBR to full cure, the preform is exposed to radiation, an exemplary dose being about 5-25 Mrad of 10 MeV electrons, cobalt 60 gamma rays, or equivalent radiation means with similar linear energy transfer properties. Of course, the actual instrument used, and length of irradiation, will vary to achieve this irradiation level. The effects are independent of the dosage rate provided heat is removed, especially at high dosage rates and thick samples, and the radiation atmosphere is inert when the samples are irradiated at low dose rates.

In following the above process, i.e., 0.5 phr sulfur, 0.1 phr DTUD, exposure to 300° F. in the mold of about 70 minutes, followed by the given irradiation dosage, hot tear strength is increased 15-20% over comparison based on the commercially used sulfur-cure, discussed above. As the relevant information in the industry suggests irradiation does not improve physical properties such as tear strength, this is clearly unexpected.

Further dramatic evidence of the improvement in the SBR treated according to this invention can be observed by reference to the ozone resistance test. A standard ozone test comprises exposing the SBR to the following conditions:

ASTM-D-1149, Specimen B (bent loop test at 40° C. with ozone concentration of 50 pphm).

Commercially available SBR (Belvoir Research Development Center Standard 15 SBR 26) fails, under the standard ozone test, in less than 7 days. Product processed as indicated above resists and survives under the same conditions for at least 35 days, without any evidence of ozone corrosion. This is a phenomenal improvement of at least 500% in ozone resistance, and is particularly meaningful in terms of military application and industrial applications under severe conditions.

Absolute values for the tear strength of the example of the invention discussed above are 180-183 lbs./in. as opposed to the conventional sulfur cured compound value of 132-167 lbs./in. As ozone resistance is given in the standard test in terms of days of survival without failure, the product of this invention has yet to exhibit any failure at all. Wear resistance, and resistance to crack initiation and propagation were also sharply improved.

Obviously, numerous modifications and variations of the present invention are possible in light of the above teachings. In particular, it is noted that radiation dosage for a thick sample will be distributed over a variable range. The dosage figures given herein are idealized for thin sample situations. It is therefore to be understood that within the scope of the appended claims, the invention may be practiced otherwise than as specifically described herein.

What is claimed as new and desired to be secured by Letters Patent of the United States is:

1. A method for improving physical and chemical characteristics of styrene-butadiend rubber comprising adding to a styrene-butadiene copolymer composition 0.1 phr-0.08 phr sulfur, 0-0.5 phr accelerator and 0.05 phr-2 phr 3,9-divinyl-2,4,8,10 tetraoxyspiro- undecane as a crosslinking agent, placing said mixture in a mold, and exposing the mold to moderate heat for sufficient time to form a preform having strength sufficient to retain the integrity of the molded form, and thereafter exposing said preform to an irradiation dosage of 5-25 Mrad of 10 MeV electron equivalent, wherein said sulfur, accelerator and crosslinking agent concentration, and irradiation dosage, are selected so as to provide tear resistance, in the product of that process, of 180-183 lbs/in, and an ozone resistance of at least 35 days, under standard ozone tests ASTM-D 1149, without evidence of ozone corrosion.

2. The process of claim 1, wherein said sulfur is added in an amount of 0.5 phr and said crosslinking agent is added in an amount of 0.1 phr, and said mixture is heated in said mold for a period of 35-120 minutes at a temperature of 280° F.-320° F.

3. The process of claim 2, wherein said temperature is about 300° F.

4. The process of claim 1, wherein said styrene-butadiene copolymer composition further comprises additives selected from the group consisting of carbon black, zinc oxide, stearic acid, anti-ozidants, anti-oxidants and mixtures thereof.

5. The SBR produced according to the process of claim 1, which exhibits a minimum tear strength of 180 lbs./in. and survives under standard ozone test ASTM-D1149 for at least 35 days without evidence of ozone corrosion.

* * * * *